(12) United States Patent
Cho (10) Patent No.: US 9,580,099 B2
(45) Date of Patent: Feb. 28, 2017

(54) METHOD FOR FORMING A HEATING ELEMENT FOR USE WITH A STEERING WHEEL

(71) Applicant: Hwajin Co., Ltd., Gyeongsangbuk-do (KR)

(72) Inventor: Man Ho Cho, Gyeonggi-do (KR)

(73) Assignee: Hwajin Co., Ltd. (KR)

( * ) Notice: Subject to any disclaimer, the term of this patent is extended or adjusted under 35 U.S.C. 154(b) by 447 days.

(21) Appl. No.: 14/153,975

(22) Filed: Jan. 13, 2014

(65) Prior Publication Data

US 2014/0123474 A1 May 8, 2014

Related U.S. Application Data

(60) Division of application No. 13/867,276, filed on Apr. 22, 2013, now Pat. No. 9,067,619, which is a (Continued)

(30) Foreign Application Priority Data

Oct. 20, 2010 (KR) .................. 10-2010-0102514

(51) Int. Cl.
*B60L 1/02* (2006.01)
*B62D 1/06* (2006.01)
(Continued)

(52) U.S. Cl.
CPC ............... *B62D 1/06* (2013.01); *B62D 1/065* (2013.01); *H01C 17/02* (2013.01); *H01C 17/06* (2013.01);
(Continued)

(58) Field of Classification Search
CPC .......... B62D 1/06; B62D 1/065; H01C 17/02; H01C 17/06; H01C 17/06506;
(Continued)

(56) References Cited

U.S. PATENT DOCUMENTS 6,093,908 A 7/2000 Haag
2001/0030182 A1* 10/2001 Haag ..................... B62D 1/065
219/204
(Continued)

FOREIGN PATENT DOCUMENTS

GB 447619 A 5/1936
JP 4-015162 A 1/1992
(Continued)

OTHER PUBLICATIONS

Chinese Office Action for Counterpart Chinese Application No. CN 201180061004.5, dated Jan. 21, 2015, with English translation, 11 pgs.
(Continued)

*Primary Examiner* — Dana Ross
*Assistant Examiner* — Brandon Harvey
(74) *Attorney, Agent, or Firm* — Brinks Gilson & Lione (57) ABSTRACT

A method of forming a heating element for use with a steering wheel includes (i) forming a first heating part of a heating element which is coated in a longitudinal direction of the rim along an inner diameter portion of the rim by continuously connecting loops having the same shape, (ii) forming a second heating part of the heating element which is coated in the longitudinal direction of the rim along an outer diameter portion of the rim by continuously connecting loops having the same shape, (iii) forming a third heating part of the heating element which is coated in the longitudinal direction of the rim by continuously connecting loops having the same shape between the first heating part and the second heating part; and (iv) adjusting an electrical resistance of the heating element according to a coating width or thickness of the conductive paste.

3 Claims, 10 Drawing Sheets

Related U.S. Application Data continuation of application No. PCT/KR2011/002166, filed on Mar. 30, 2011.

(51) Int. Cl.
*H05B 3/36* (2006.01)
*H01C 17/02* (2006.01)
*H01C 17/06* (2006.01)

(52) U.S. Cl.
CPC ......... *H05B 3/36* (2013.01); *H05B 2203/014* (2013.01); *Y10T 29/49083* (2015.01); *Y10T 29/49099* (2015.01)

(58) Field of Classification Search
CPC ........ H01C 17/06513; H01C 17/06573; H05B 3/36; H05B 2203/014; H05B 3/10; H05B 3/12; H05B 3/16; H05B 3/56; H05B 2203/017; Y10T 29/49082; Y10T 29/49083; Y10T 29/49099
USPC ....... 219/201, 202, 204, 542, 543, 546, 528, 219/529, 539, 548, 549, 552
See application file for complete search history.

(56) References Cited

U.S. PATENT DOCUMENTS

| | | | |
|---|---|---|---|
| 2002/0033389 A1 | 3/2002 | Sugiyama et al. | |
| 2003/0183620 A1* | 10/2003 | Wong | H05B 3/34 219/549 |
| 2004/0155029 A1 | 8/2004 | Haag | |
| 2005/0082269 A1 | 4/2005 | Haag et al. | |
| 2007/0181565 A1* | 8/2007 | Murahashi | B60Q 1/0005 219/629 |
| 2010/0071502 A1 | 3/2010 | Yasuda et al. | |

FOREIGN PATENT DOCUMENTS

| | | | |
|---|---|---|---|
| JP | 2002-096740 A | 4/2002 | |
| JP | 2007-290685 A | 11/2007 | |
| JP | 2008-114680 A | 5/2008 | |
| KR | 20-1991-0011426 | 7/1991 | |
| KR | 10-1992-0019598 | 11/1992 | |
| KR | 20-1998-0002418 | 3/1998 | |
| KR | 20-1998-0053031 | 10/1998 | |
| KR | 1020000072997 A | 12/2000 | |
| KR | 1020030018737 A | 3/2003 | |
| KR | 20-0331802 | 10/2003 | |
| KR | WO 2005009824 A1 * | 2/2005 | ............ B62D 1/065 |
| KR | 20-2010-0008712 | 9/2010 | |
| WO | WO 2005/009824 A1 | 2/2005 | |

OTHER PUBLICATIONS

Office Action mailed Oct. 21, 2014 for U.S. Appl. No. 13/867,276.
Extended European Search Report in corresponding European Application No. 11834507.3, dated Feb. 26, 2014, 6 pages.
International Search Report and Written Opinion in corresponding International Application No. PCT/KR2011/002166, dated Dec. 21, 2011, 7 pages.

\* cited by examiner

Fig. 1

Prior Art

Fig. 2

Prior Art

Fig. 3

Prior Art

Fig. 4

Prior Art

Fig. 5

Prior Art

Fig. 6

Prior Art

METHOD FOR FORMING A HEATING ELEMENT FOR USE WITH A STEERING WHEEL

PRIORITY

This application is a divisional of application Ser. No. 13/867,276, filed Apr. 22, 2013 and entitled Steering Wheel Including Heating Element. Application Ser. No. 13/867,276 is a continuation of Patent Cooperation Treaty (PCT) international application Serial No. PCT/KR2011/002166, filed on Mar. 30, 2011 and which designates the United States, which claims priority to Korean Patent Application No. 10-2010-0102514, filed on Oct. 20, 2010. The entirety of both Patent Cooperation Treaty (PCT) international application Serial No. PCT/KR2011/002166 and Korean Patent Application No. 10-2010-0102514 are hereby incorporated by reference herein.

BACKGROUND OF THE INVENTION

Technical Field

The present invention relates to a steering wheel including a heating element, and more particularly, to a steering wheel including a heating element which may minimize a temperature deviation felt by a driver by heating an entire surface of a rim to a uniform temperature. The present invention also relates to a steering wheel including a heating element which may continuously generate heat even though a portion of the heating element is cracked or is electrically disconnected, minimize an increase in a diameter of the steering wheel although the heating element is employed, and directly transfer a transfer film, on which an aesthetic decoration pattern such as a wood pattern is printed, onto a surface of the heating element.

Background Art

A steering wheel is a driver-manipulated element of a steering system of a vehicle. Many studies have been conducted with regard to the steering wheel for improving its esthetic appearance, convenience of holding, use of functional elements therewith, etc. In particular, when starting to drive a vehicle in winter, a temperature of a steering wheel is lower than that of a human body, which affects the driver and might pose a safety-related problem. Accordingly, various apparatuses for heating a steering wheel to a temperature greater than that of a human body have been studied.

Figure 1:
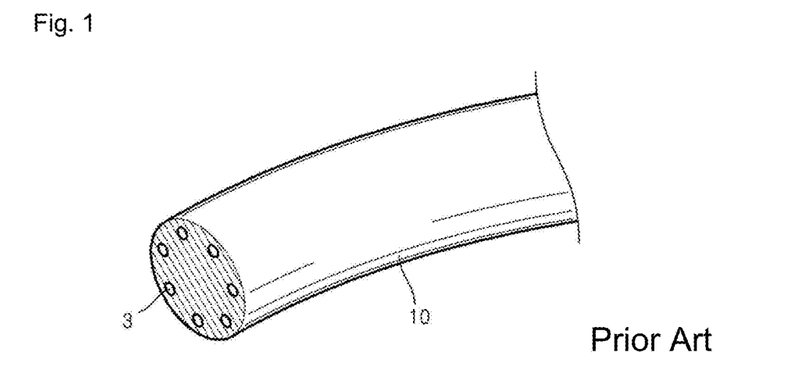
FIGS. 1 and 2 are schematic views illustrating a steering wheel including a conventional heating element.

In a conventional technique for heating a steering wheel as disclosed in Korean Utility Model Application No. 1989-0020599, Korean Patent Application No. 1992-0000945, and Korean Utility Model Application No. 1996-16958, heating coils 3 are buried in a rim portion 10 of a steering wheel as shown in FIG. 1.

Figure 2:
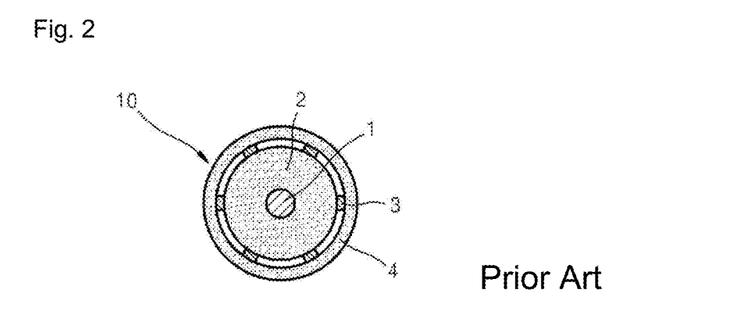

In order to bury the heating coils 3, as shown in FIG. 2, an insulating covering material 2 is coated around a core 1 and the heating coils 3 are bonded to an outer circumferential surface of the insulating covering material 2. Afterwards, a surface of the rim portion 10 is finished using a finishing member 4 such as a synthetic resin.

In another method of burying the heating coils 3, as disclosed in Korean Utility Model Registration Application No. 1996-066213 (FIG. 3), after winding a heating wire 5 in a coil shape on an outer circumferential surface of the core 1, a surface of the heating wire 5 is finished by using a synthetic resin mold 6.

However, as shown in FIG. 2, when the heating coils 3 are fixed around the outer circumferential surface of the insulating covering material 2, it is quite difficult to arrange the thin heating coils 3 at uniform intervals in a working process, and a temperature deviation between areas in the rim portion 10 occurs in practice due to irregular distances between the heating coils 3.

Figure 3:
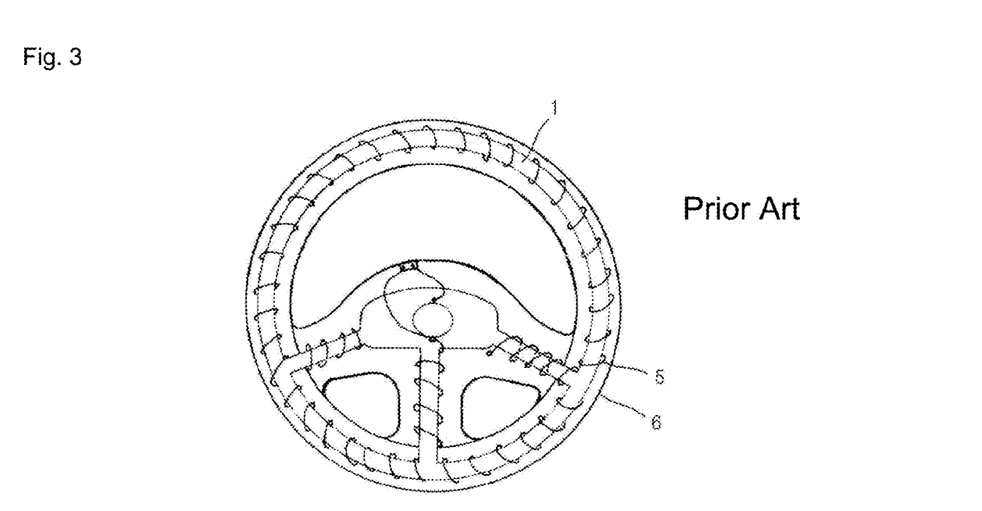
FIG. 3 is a schematic view illustrating a steering wheel including another conventional heating element.

Also, as shown in FIG. 3, when the heating wire 5 is wound in a coil shape, a temperature deviation may also occur due to irregular winding gaps, and, in particular, since only one heating wire 5 is wound, when the heating wire 5 breaks during a working process, it is necessary to replace and re-wind the entire heating wire 5 again. Also, when the heating coils 3 or the heating wire 5 is buried as described above, it takes a certain period of time for heat to be transferred from the heating coils 3 or the heating wire 5 to a surface of the rim portion 10.

Figure 4:
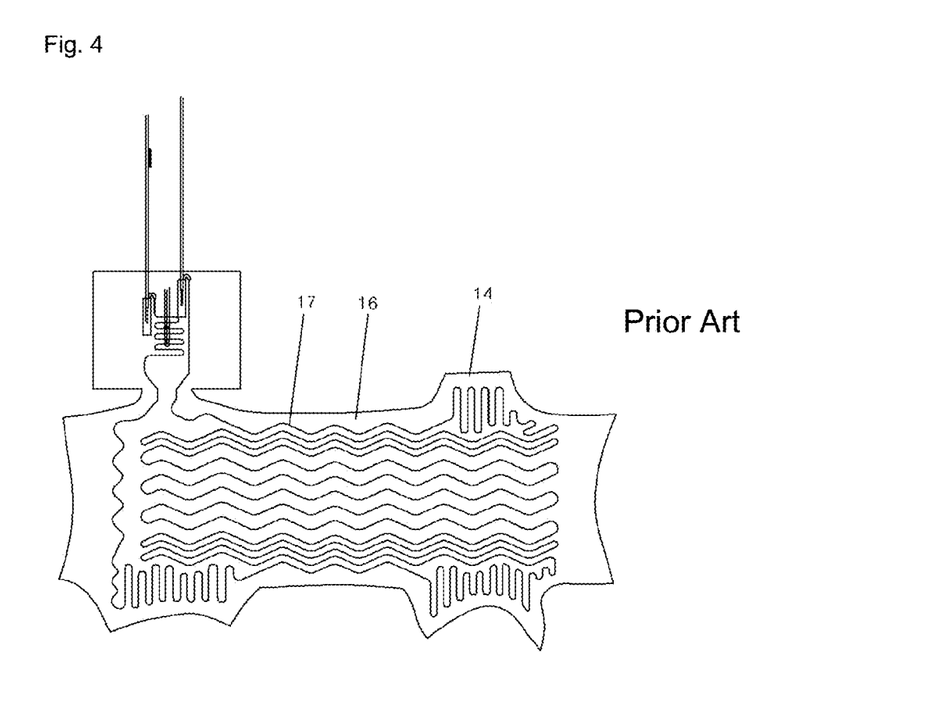
FIG. 4 is a schematic view illustrating a plane heater as a conventional heating element.
Figure 5:
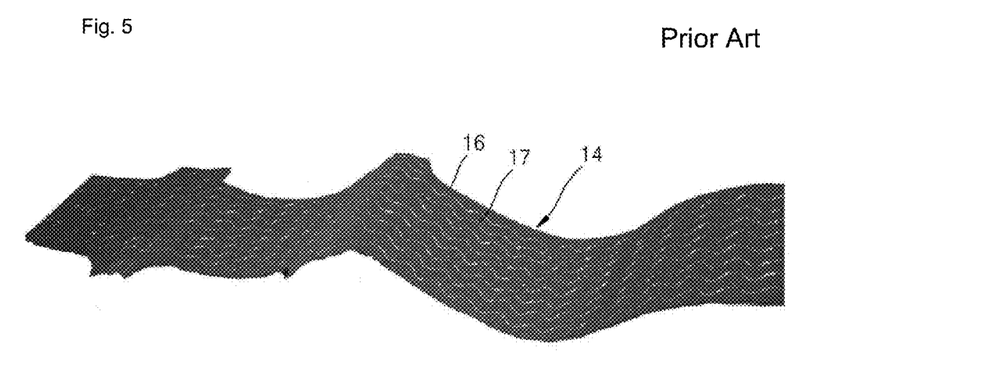
FIG. 5 is a photograph illustrating the plane heater of FIG. 4.
Figure 6:
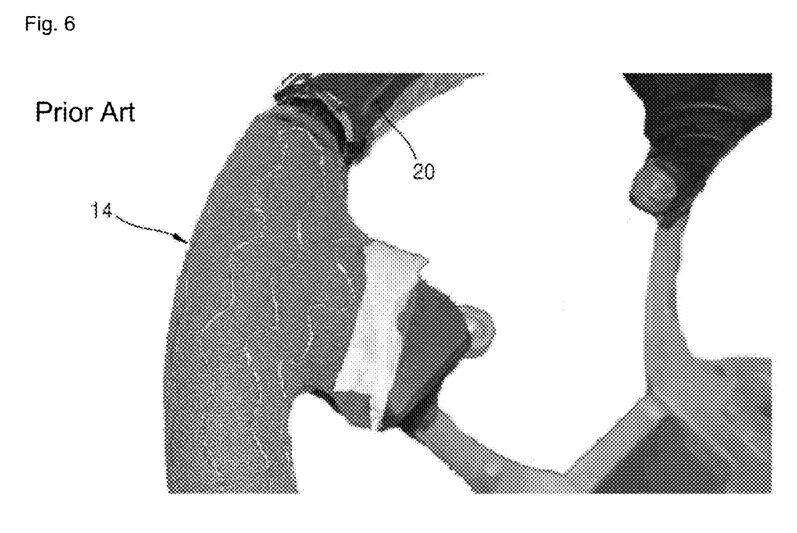
FIG. 6 is a photograph of a steering wheel on which the plane heater of FIG. 5 is mounted.

A plane heater 14 for a steering wheel is disclosed in Japanese Patent Laid-Open Application No. 2007-290685 (FIG. 4). In the plane heater 14, heating wires 17 are fixed to a supporter 16 formed of a nonwoven material. FIG. 5 is a photograph of an actual plane heater 14, and FIG. 6 is a photograph showing a steering wheel including the plane heater 14. As shown in FIG. 6, the plane heater 14 is mounted on an outer circumference of a rim of the steering wheel. The plane heater 14 provides a cushioning effect when a driver holds the steering wheel since the supporter 16 of the plane heater 14 is formed of a nonwoven material.

However, when the plane heater 14 is used, a thickness (diameter) of the steering wheel is increased due to the supporter 16 formed of a nonwoven material. Also, the steering wheel is finished by covering an actual wood 20 or a leather to protect the plane heater 14 and to gentrify a decoration. In this case, a thickness of the steering wheel is further increased.

The Cubic Printing (Curl-fit) method for a rim of a steering wheel of a vehicle disclosed in Korean Patent Registration No. 10-0472399 of the current inventor may not be applied to the plane heater 14 having a rough surface as described above. That is, a transfer film, on which a wood pattern for an esthetic decoration of the steering wheel is printed, may not be directly transferred onto the rough surface of the plane heater 14. For a decoration of the steering wheel, as shown in FIG. 6, after processing a wood piece 20, the processed wood piece 20 must be applied to the plane heater 14 (after processing two pieces of woods having a semi-circle shape, the two pieces of woods are joined to surround the surface of the plane heater 14).

In this case, the manufacture of the steering wheel is time-consuming, and thus, expensive. Also, due to the low thermal conductivity of the wood piece 20, the overall thermal conductivity of the steering wheel is reduced, and accordingly, heat of the plane heater 14 may not be efficiently utilized.

SUMMARY OF THE INVENTION

One embodiment of the present invention provides a steering wheel including a heating element which may minimize a temperature deviation felt by a driver by heating an entire surface of a rim to a uniform temperature.

First, according to one embodiment of a method of forming a heating element for use with a steering wheel, the method includes (i) forming a first heating part of a heating element which is coated in a longitudinal direction of the rim along an inner diameter portion of the rim by continuously connecting loops having the same shape, (ii) forming a second heating part of the heating element which is coated in the longitudinal direction of the rim along an outer diameter portion of the rim by continuously connecting loops having the same shape, (iii) forming a third heating part of the heating element which is coated in the longitudinal direction of the rim by continuously connecting loops having the same shape between the first heating part and the second heating part; and (iv) adjusting an electrical resistance of the heating element according to a coating width or thickness of the conductive paste.

Second, according to one embodiment of the steering wheel, since a conductive paste is formed as a heating element into a predetermined pattern on a surface of a rim and an electrical resistance of the predetermined pattern decreases away from an inner diameter portion of the rim toward an outer diameter portion of the rim, a temperature deviation at the surface of the rim may be lower than that in a conventional steering wheel.

Third, according to another embodiment of the steering wheel, since a heating element includes a plurality of heating lines, even though some of the heating lines are electrically disconnected, heat may be continuously generated from remaining heating lines.

Fourth, according to further another embodiment of the steering wheel, since a conductive paste is formed as a heating element on a surface of a rim, a driver may feel a sense of soft touch when holding the rim with his/her hands.

Fifth, according to further another embodiment of the steering wheel, since a conductive paste is coated and formed as a heating element on a surface of a rim, a transfer film, on which a decoration pattern is printed, may be transferred onto a surface of the heating element. Accordingly, heat loss of the heating element may be minimized and a thickness (diameter) of the rim may be smaller than that in a conventional steering wheel, thereby making it possible for a driver to stably hold the rim.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention provides a steering wheel including a heating element which may minimize a temperature deviation felt by a driver by heating an entire surface of a rim to a uniform temperature. The present invention also provides a steering wheel including a heating element which may continuously generate heat in other portions even though a portion of the heating element is electrically disconnected. The present invention also provides a steering wheel including a heating element which may transfer a transfer film, on which a decoration pattern is printed, onto a surface of the heating element.

According to an aspect of the present invention, there is provided a steering wheel comprising a rim, and a heating element coated on a surface of the rim, the heating element being heated by power supply, wherein the heating element is an electrically conductive paste, and comprises a first heating part which is coated in a longitudinal direction of the rim along an inner diameter portion of the rim by continuously connecting loops having the same shape, a second heating part which is coated in the longitudinal direction of the rim along an outer diameter portion of the rim by continuously connecting loops having the same shape, and a third heating part which is coated in the longitudinal direction of the rim by continuously connecting loops having the same shape between the first heating part and the second heating part, wherein an electrical resistance decreases in order of the first heating part, the third heating part, and the second heating part.

The steering wheel may further include a plurality of first connection units which electrically connect the first heating part and the third heating part, and a plurality of second connection units which electrically connect the second heating part and the third heating part. The steering wheel may further include a decoration pattern layer which is formed by transferring a transfer film, on which a decoration pattern is printed, onto a surface of the heating element. The steering wheel may further include a base layer which is formed between the heating element and the decoration pattern layer.

A steering wheel according to one embodiment of the present invention may enable a driver to touch a steering wheel in a warm condition and comfortably drive a vehicle by employing a heating element and heating a rim of a steering wheel to a temperature higher than that of a human body in cold weather, and particularly, enable the driver to comfortably hold a handle by heating an entire surface of the rim to a uniform temperature.

Also, the steering wheel may directly transfer a transfer film having a decoration pattern layer onto a surface of the heating element, adopt an aesthetic decoration pattern layer such as a wood pattern, and provide a sense of soft touch when the driver holds the rim. Also, the steering wheel may stably generate heat even though a portion of the heating element is electrically disconnected.

Figure 7:
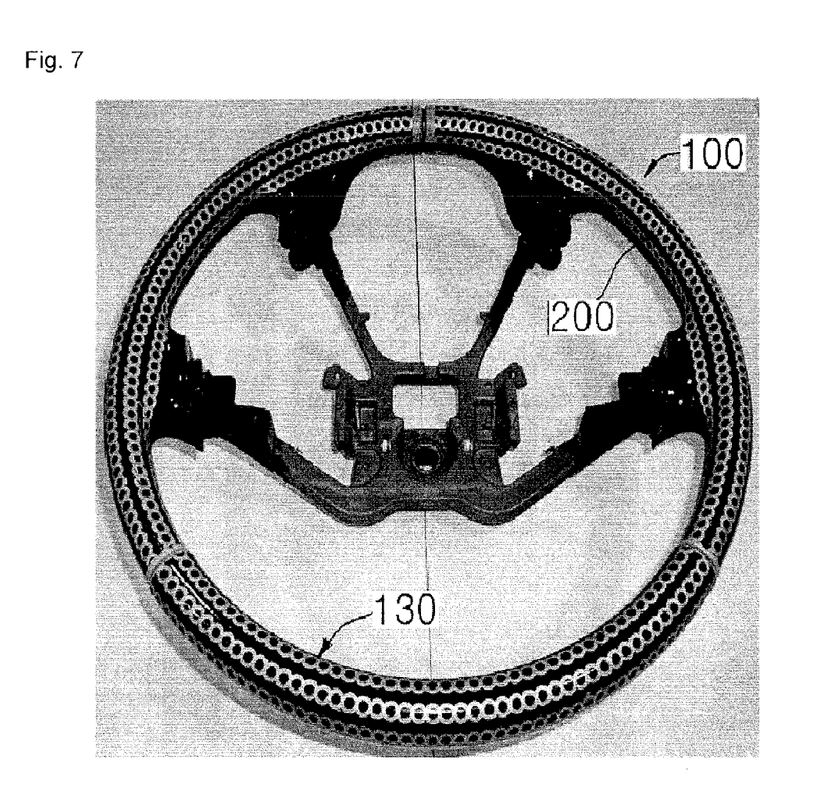
FIG. 7 is a photograph of a steering wheel including a heating element according to an embodiment of the present invention.
Figure 8:
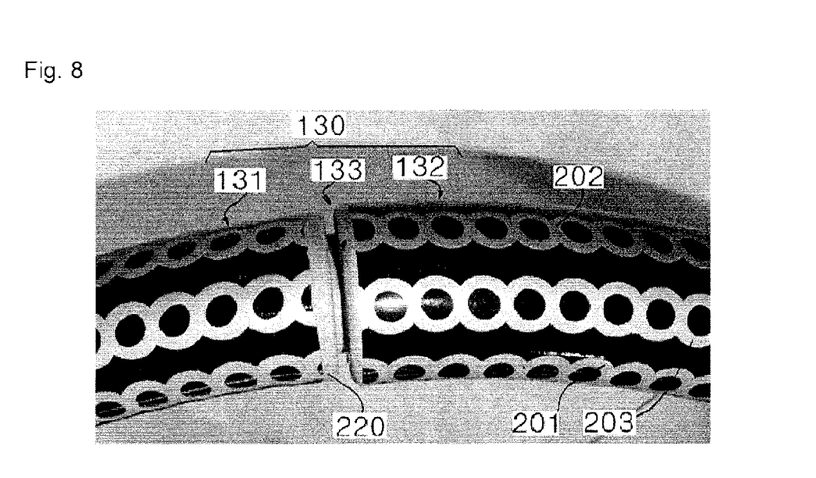
FIG. 8 is a photograph illustrating essential parts of the steering wheel of FIG. 7.
Figure 9:
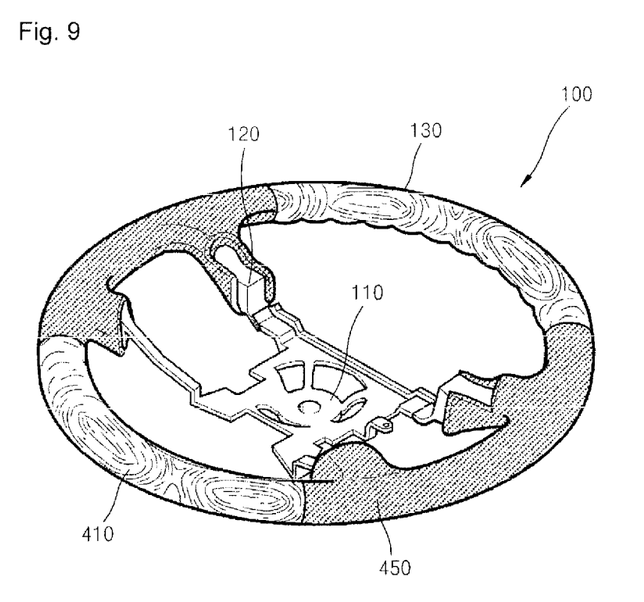
FIG. 9 is a perspective view illustrating a state where a transfer film and leather are employed in a steering wheel on which a conductive paste is coated as the heating element.

FIG. 7 is a photograph of a steering wheel 100 according to an embodiment of the present invention, in which heating lines of a heating element 200 are coated in parallel on a surface of a rim 130. FIG. 8 is an enlarged photograph illustrating essential parts of the steering wheel 100 of FIG. 7. FIG. 9 is a perspective view illustrating a state where a decoration pattern layer 410 is formed on a portion of the rim 130 on which the heating element 200 is coated as shown in FIG. 7 and a leather 450 is coupled to remaining portions of the rim 130.

Figure 15:
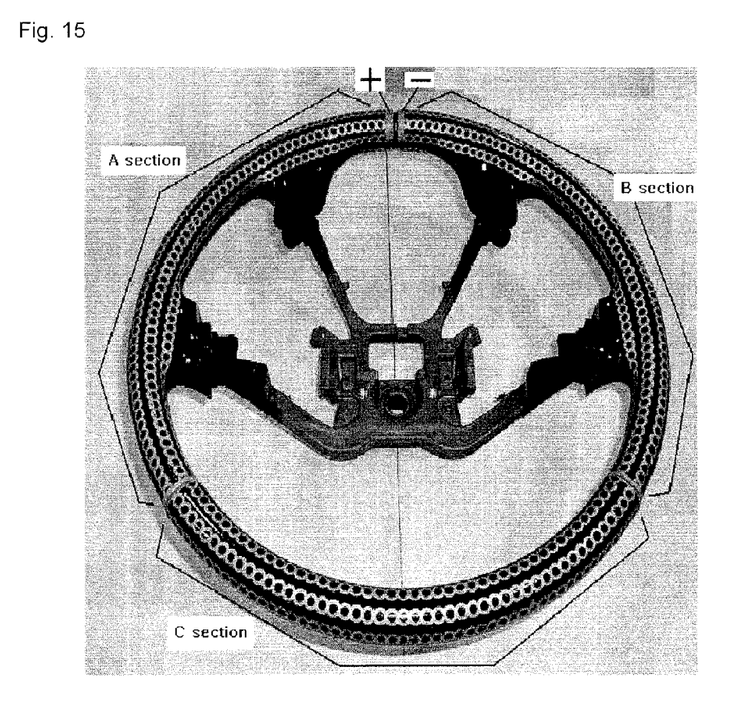
FIG. 15 is a photograph illustrating that a rim to which a plurality of molds are connected is divided in units of the molds into an A section, a B section, and a C section.
Figure 16:
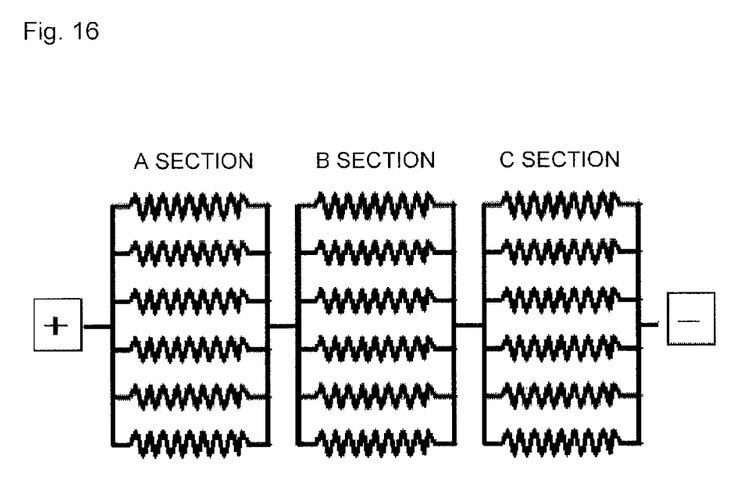
FIG. 16 is a diagram illustrating one embodiment of the heating element having a lattice shape as an electrical circuit.

FIG. 15 is a photograph illustrating that the rim 130 to which a plurality of molds are connected is divided in units of the molds into an A section, a B section, and a C section. FIG. 16 is a diagram illustrating the heating element 200 having a lattice shape as an electrical circuit. The A, B, and C sections are connected to one another in series, and the heating lines of the heating element 200 in each of the A, B, and C sections are connected to one another in parallel. In the present embodiment, from among the steering wheel 100 including a boss 110, a spoke 120, and the rim 130, the heating element 200 is coated on the rim 130 which is mainly held by a driver while driving.

Referring to FIG. 7 and FIG. 8, the heating element 200 is coated as an electrically conductive paste on a surface of the rim 130. The heating element 200 is coated as a conductive paste on the surface of the rim 130, and the heating element 200 is formed such that an electrical resistance decreases away from an inner diameter portion of the rim 130 toward an outer diameter portion of the rim 130. In this case, since a heating temperature of the heating element 200 increases away from the inner diameter portion toward the outer diameter portion that has a circumferential length greater than that of the inner diameter portion, the rim 130 is heated to a uniform temperature.

FIGS. 11 through 14 are schematic views illustrating various patterns of the heating element 200 employed in the present embodiment. The heating element 200, which is a conductive paste, includes a first heating part 201 which is coated in a longitudinal direction of the rim 130 along the inner diameter portion of the rim 130 by continuously connecting loops having the same shape, a second heating part 202 which is coated in the longitudinal direction of the rim 130 along the outer diameter portion of the rim 130 by continuously connecting loops having the same shape, and a third heating part 203 which is coated in the longitudinal direction of the rim 130 by continuously connecting loops having the same shape between the first heating part 201 and the second heating part 202. An electrical resistance decreases in order of the first heating part 201, the third heating part 203, and the second heating part 202.

In this case, since the first through third heating parts 201 through 203 of the heating element 200 are formed in loop shapes, power supply may be prevented from being cut off even though some of the loops are electrically disconnected. Also, since an electrical resistance decreases toward the outer diameter portion and thus a heating temperature increases toward the outer diameter portion that has a longer circumferential length than that of the inner diameter portion, heat may be generated at a uniform temperature between the inner diameter portion and the outer diameter portion.

Figure 12:
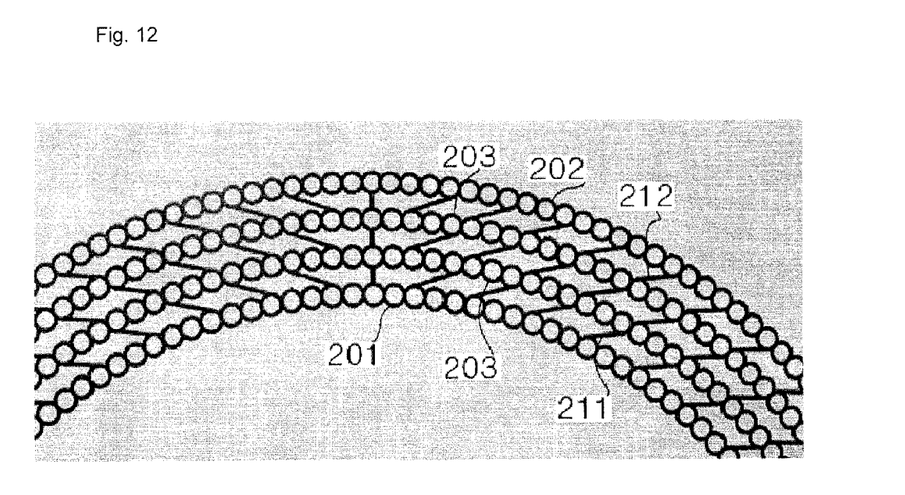
Figure 13:
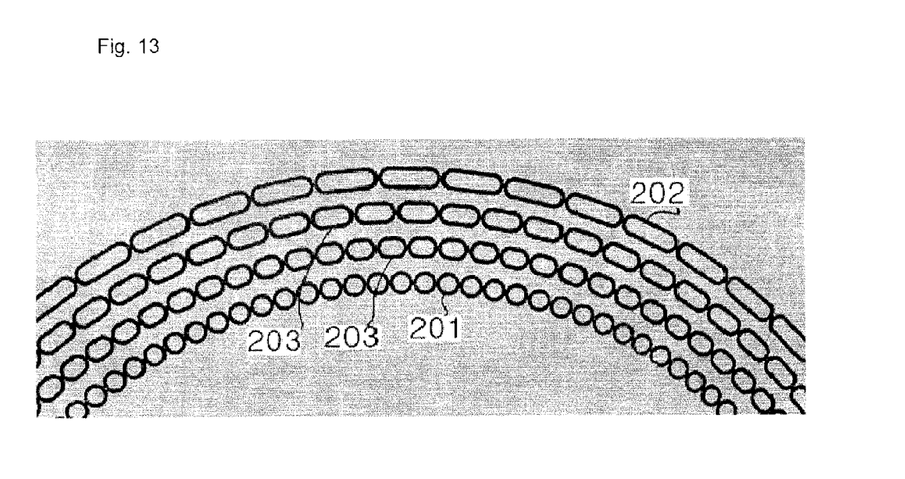
Figure 14:
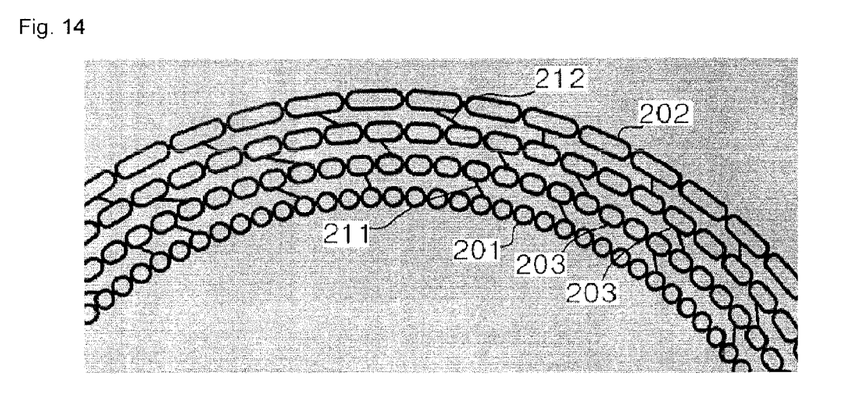

In particular, as shown in FIGS. 12 and 14, a plurality of first connection units 211 which electrically connect the first heating part 201 and the third heating part 203, and a plurality of second connection units 212 which electrically connect the second heating part 202 and the third heating part 203 may be further coated on the heating element 200. In this case, heat may be generated between the heating parts 201 through 203, and electrical disconnection between the heating parts 201 through 203 may be prevented. Electrical resistances of the heating parts 201 through 203 and the connection units 211 and 212 may be adjusted according to a coating width or thickness of the conductive paste.

Meanwhile, in order to improve the appearance of the steering wheel 100, as shown in FIG. 9, the rim 130 is divided into a portion where a decoration pattern layer 410 on which a wood pattern is formed is transferred and another portion where a leather 450 is covered. That is, as shown in FIGS. 8 and 9, the rim 130 includes a first mold 131 to which the decoration pattern layer 410 is transferred and a second mold 132 where the leather 450 is covered, a groove portion 133 is formed between the first and second molds 131 and 132, the leather 450 is wound around the second mold 132, and finishing of the leather 450 may be performed in the groove portion 133.

As described above, since the groove portion 133 is formed between the first mold 131 and the second mold 132, it is difficult to electrically connect the first through third heating parts 201 through 203 coated on an outer circumferential surface of the second mold 132 and the first through third heating parts 201 through 203 coated on an outer circumferential surface of the first mold 131 of the rim 130.

Accordingly, the first through third heating parts 201 through 203 are connected by forming (entirely coating) a connection portion 220 in the groove portion 133.

Figure 10A:
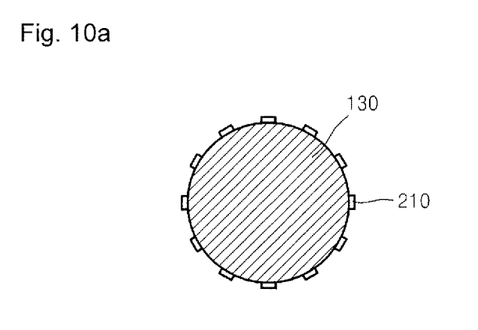
FIGS. 10A through 10D are schematic views for explaining a process of forming a transfer pattern layer on a surface of the steering wheel on which the heating element is coated.
Figure 10B:
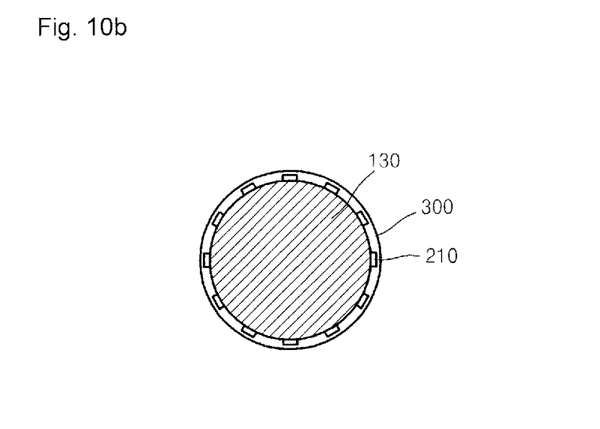
Figure 10C:
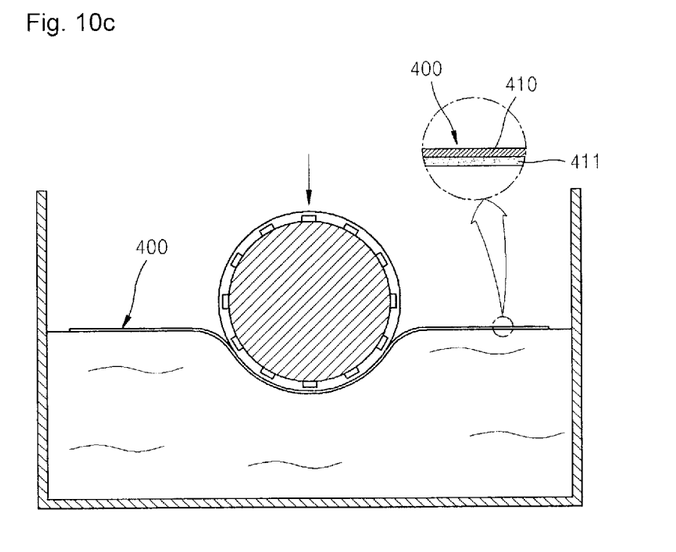
Figure 10D:
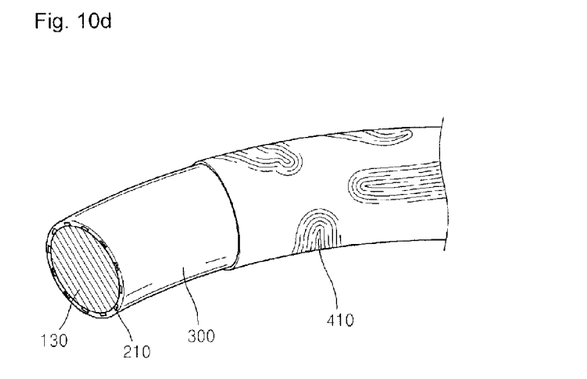
Figure 11:
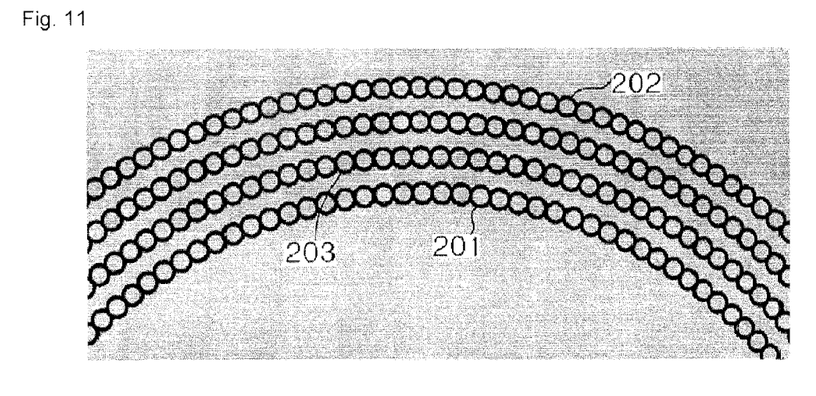
FIGS. 11 through 14 are schematic views illustrating various patterns of the heating element.

Meanwhile, the decoration pattern layer 410 is formed by transferring a transfer film 400 on which a decoration pattern is printed onto a surface of the heating element 200. Referring to FIG. 10C, the transfer film 400 includes the decoration pattern layer 410 on which a pattern such as a wood pattern is printed and a poly vinyl alcohol (PVA) layer 411. The decoration pattern layer 410 is activated by using an activator such as a thinner on a top surface of the transfer film 400 that is floated on a surface of water during a transfer operation, and then the rim 130 is soaked below the surface of the water, so that the decoration pattern layer 410 is transferred to the surface of the rim 130 due to water pressure.

In this case, due to the groove portion 133 between the first through third heating parts 201 through 203, a three-dimensional effect of the decoration pattern may be achieved and slipperiness along the rim 130 may be prevented.

Also, as shown in FIGS. 10A through 10D, a base layer 300 having a color different from that of the decoration pattern of the decoration pattern layer 410 is further formed between the heating element 200 and the decoration pattern layer 410. The base layer 300 emphasizes the appearance of the decoration pattern by including a paint having a color that is different from that of the decoration pattern of the decoration pattern layer 410. Also, since the base layer 300 fills the groove portion 133 formed between the heating parts 201 through 203, the decoration pattern layer 410 may be more smoothly transferred to the rim 130.

In the steering wheel 100 described above, since the heating element 200 coated on the surface of the rim 130 includes the first through third heating parts 201 through 203, even though one of the first through third heating parts 201 through 203 is electrically disconnected, heat may be continuously generated from remaining heating parts.

Also, in the rim 130 in which the groove portion 133 is formed between the first mold 131 and the second mold 132, since the connection portion 220 of the heating element 200 is formed in the groove portion 133 and around the groove portion 133, the first through third heating parts 201 through 203 coated on the outer circumferential surface of the first mold 131 and the first through third heating parts 201 through 203 coated on the outer circumferential surface of the second mold 132 may be easily electrically connected to each other through the connection portion 220.

As described above, according to one embodiment of the steering wheel, since a conductive paste is coated as a heating element and an electrical resistance decreases away from an inner diameter portion of a rim toward an outer diameter portion of the rim, the rim may be entirely heated to a uniform temperature and a driver may hold the rim without a temperature deviation.

Since the heating element is employed in the steering wheel of a vehicle, the driver may warmly hold the rim of the steering wheel in winter, thereby leading to safe driving. Even though a portion of the heating element is short-circuited, heat may be continuously generated from other portions. Also, although an aesthetic decoration pattern such as a wood pattern is adopted, since a diameter of the steering wheel is low, convenience of use may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

I claim:

1. A method of forming a heating element for use with a steering wheel and heating an entire rim of the steering wheel to an uniform temperature, comprising:
    forming a first heating part of the heating element which is coated in a longitudinal direction of the rim along an inner diameter portion of the rim by continuously connecting first loops, each of the first loops having a same shape;
    forming a second heating part of the heating element which is coated in the longitudinal direction of the rim along an outer diameter portion of the rim by continuously connecting second loops, each of the second loops having a same shape;
    forming a third heating part of the heating element which is coated in the longitudinal direction of the rim by continuously connecting third loops between the first heating part and the second heating part, each of the third loops having a same shape; and
    wherein the first heating part, the second heating part and the third heating part comprise a conductive paste;
    wherein the third heating part is spaced apart from the first heating part and the second heating part;
    wherein the second heating part has a circumferential length greater than that of the inner diameter portion; and
    adjusting an electrical resistance of the heating element according to a coating width or thickness of the conductive paste by forming a coating width or a thickness of the electrically conductive paste such that electrical resistance of the first, the second and the third heating parts decreases away from the inner diameter portion of the rim toward the outer diameter portion of the rim in the order of the first heating part, the third heating part, and the second heating part.

2. The method of claim 1, further comprising:
    forming a first mold, a second mold and a groove portion between the first mold and the second mold on the rim;
    coating the first heating part, the second heating part and the third heating part on the first mold and on the second mold;
    connecting the first heating part, the second heating part and the third heating part on the first mold and the second mold with a connection portion.

3. The method of claim 1, further comprising forming the heating element with a plurality of heating lines.

* * * * *